United States Patent
Amano et al.

(10) Patent No.: US 9,172,251 B2
(45) Date of Patent: Oct. 27, 2015

(54) CONTROLLING THE WIRELESS TRANSMISSION OF POWER BASED ON THE EFFICIENCY OF POWER TRANSMISSIONS

(75) Inventors: Yasushi Amano, Aichi-ken (JP); Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 669 days.

(21) Appl. No.: 13/128,778

(22) PCT Filed: Oct. 30, 2009

(86) PCT No.: PCT/IB2009/007282
§ 371 (c)(1),
(2), (4) Date: Jul. 13, 2011

(87) PCT Pub. No.: WO2010/055381
PCT Pub. Date: May 20, 2010

(65) Prior Publication Data
US 2011/0270462 A1    Nov. 3, 2011

(30) Foreign Application Priority Data

Nov. 14, 2008  (JP) .................................. 2008-291669

(51) Int. Cl.
*H02J 7/14* (2006.01)
*H02J 5/00* (2006.01)
(Continued)

(52) U.S. Cl.
CPC ............... *H02J 5/005* (2013.01); *B60L 11/182* (2013.01); *B60L 11/1833* (2013.01); *H02J 7/025* (2013.01);
(Continued)

(58) Field of Classification Search
CPC ........ F24D 19/10; F24D 19/1009; F24J 3/08; Y02E 10/10; Y02B 10/40
USPC ......................................................... 700/297
See application file for complete search history.

(56) References Cited

U.S. PATENT DOCUMENTS 5,243,289 A * 9/1993 Blum et al. .................... 324/322
5,808,587 A * 9/1998 Shima ........................... 343/895
(Continued)

FOREIGN PATENT DOCUMENTS

EP    0 788 212 A2    8/1997
GB    2 418 541 A     3/2006
(Continued)

OTHER PUBLICATIONS

Slovick, M., "Wireless Charging of Electric Vehicles: The Next Big Thing?", May 11, 2011, New Technology.*
(Continued)

*Primary Examiner* — Mohammad Ali
*Assistant Examiner* — Kelvin Booker
(74) *Attorney, Agent, or Firm* — Oliff PLC (57) ABSTRACT

Power is contactlessly supplied from a power transmitting portion to a power receiving portion. A transmitting efficiency detecting portion detects the transmitting efficiency, and a determining portion determines whether the transmitting efficiency is equal to or greater than a specified value. If the transmitted efficiency is less than the specified value, an obstruction may be present so power temporarily stops being transmitted. Power is then periodically transmitted with a minute power and the efficiency is detected. If the efficiency is equal to or greater than the specified value, power starts to be transmitted again with regular power.

10 Claims, 10 Drawing Sheets

(51) Int. Cl.
   *H02J 7/02*   (2006.01)
   *H02J 17/00*  (2006.01)
   *B60L 11/18*  (2006.01)

(52) U.S. Cl.
   CPC .............. *H02J 17/00* (2013.01); *Y02T 10/7005* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | | |
|---|---|---|---|---|
| 7,043,255 | B1* | 5/2006 | Tiwari | 455/456.1 |
| 7,068,991 | B2* | 6/2006 | Parise | 455/343.1 |
| 7,257,327 | B2* | 8/2007 | Small | 398/118 |
| 7,887,113 | B2* | 2/2011 | Lambarth et al. | 296/20 |
| 7,903,026 | B2* | 3/2011 | Kobayashi | 342/357.72 |
| 8,035,255 | B2* | 10/2011 | Kurs et al. | 307/104 |
| 8,076,801 | B2* | 12/2011 | Karalis et al. | 307/104 |
| 8,102,147 | B2* | 1/2012 | Jung | 320/108 |
| 8,106,539 | B2* | 1/2012 | Schatz et al. | 307/104 |
| 8,114,021 | B2* | 2/2012 | Robertson et al. | 600/300 |
| 8,159,182 | B2* | 4/2012 | Kato et al. | 320/108 |
| 8,178,995 | B2* | 5/2012 | Amano et al. | 307/9.1 |
| 8,198,858 | B2* | 6/2012 | Kim et al. | 320/108 |
| 8,253,278 | B2* | 8/2012 | Cook et al. | 307/104 |
| 8,294,300 | B2* | 10/2012 | Cook et al. | 307/104 |
| 8,304,935 | B2* | 11/2012 | Karalis et al. | 307/104 |
| 8,324,759 | B2* | 12/2012 | Karalis et al. | 307/104 |
| 8,461,719 | B2* | 6/2013 | Kesler et al. | 307/104 |
| 8,461,720 | B2* | 6/2013 | Kurs et al. | 307/104 |
| 8,461,721 | B2* | 6/2013 | Karalis et al. | 307/104 |
| 8,461,722 | B2* | 6/2013 | Kurs et al. | 307/104 |
| 8,476,788 | B2* | 7/2013 | Karalis et al. | 307/104 |
| 8,482,158 | B2* | 7/2013 | Kurs et al. | 307/104 |
| 8,482,161 | B2* | 7/2013 | Amano et al. | 307/104 |
| 8,487,479 | B2* | 7/2013 | Cook et al. | 307/104 |
| 8,487,480 | B1* | 7/2013 | Kesler et al. | 307/104 |
| 8,497,601 | B2* | 7/2013 | Hall et al. | 307/104 |
| 8,559,338 | B2* | 10/2013 | Jeon et al. | 370/254 |
| 8,587,153 | B2* | 11/2013 | Schatz et al. | 307/104 |
| 8,600,517 | B2* | 12/2013 | Forsell | 607/61 |
| 8,633,615 | B2* | 1/2014 | Lee et al. | 307/104 |
| 8,760,006 | B2* | 6/2014 | Lee et al. | 307/104 |
| 2004/0142733 | A1* | 7/2004 | Parise | 455/572 |
| 2004/0246230 | A1* | 12/2004 | Oda et al. | 345/156 |
| 2007/0285096 | A1* | 12/2007 | Soutome et al. | 324/318 |
| 2008/0278264 | A1 | 11/2008 | Karalis et al. | |
| 2008/0297107 | A1* | 12/2008 | Kato et al. | 320/108 |
| 2009/0015027 | A1* | 1/2009 | Lambarth et al. | 296/20 |
| 2009/0046611 | A1* | 2/2009 | Ryu et al. | 370/311 |
| 2009/0079626 | A1* | 3/2009 | Kobayashi | 342/357.12 |
| 2009/0140691 | A1* | 6/2009 | Jung | 320/108 |
| 2009/0153098 | A1 | 6/2009 | Toya et al. | |
| 2009/0156268 | A1* | 6/2009 | Kim et al. | 455/573 |
| 2009/0284083 | A1* | 11/2009 | Karalis et al. | 307/104 |
| 2010/0008279 | A1* | 1/2010 | Jeon et al. | 370/311 |
| 2010/0013321 | A1* | 1/2010 | Onishi et al. | 307/104 |
| 2010/0110741 | A1* | 5/2010 | Lin et al. | 363/127 |
| 2010/0117456 | A1* | 5/2010 | Karalis et al. | 307/104 |
| 2010/0123452 | A1* | 5/2010 | Amano et al. | 323/359 |
| 2010/0141042 | A1* | 6/2010 | Kesler et al. | 307/104 |
| 2010/0164296 | A1* | 7/2010 | Kurs et al. | 307/104 |
| 2010/0164297 | A1* | 7/2010 | Kurs et al. | 307/104 |
| 2010/0164298 | A1* | 7/2010 | Karalis et al. | 307/104 |
| 2010/0171368 | A1* | 7/2010 | Schatz et al. | 307/104 |
| 2010/0181843 | A1* | 7/2010 | Schatz et al. | 307/104 |
| 2010/0181845 | A1* | 7/2010 | Fiorello et al. | 307/104 |
| 2010/0201203 | A1* | 8/2010 | Schatz et al. | 307/104 |
| 2010/0219694 | A1* | 9/2010 | Kurs et al. | 307/104 |
| 2010/0225175 | A1* | 9/2010 | Karalis et al. | 307/104 |
| 2010/0231053 | A1* | 9/2010 | Karalis et al. | 307/104 |
| 2010/0231340 | A1* | 9/2010 | Fiorello et al. | 336/92 |
| 2010/0237706 | A1* | 9/2010 | Karalis et al. | 307/104 |
| 2010/0237707 | A1* | 9/2010 | Karalis et al. | 307/104 |
| 2010/0237708 | A1* | 9/2010 | Karalis et al. | 307/104 |
| 2010/0237709 | A1* | 9/2010 | Hall et al. | 307/104 |
| 2010/0253152 | A1* | 10/2010 | Karalis et al. | 307/104 |
| 2010/0259108 | A1* | 10/2010 | Giler et al. | 307/104 |
| 2010/0259110 | A1* | 10/2010 | Kurs et al. | 307/104 |
| 2010/0264745 | A1* | 10/2010 | Karalis et al. | 307/104 |
| 2010/0264747 | A1* | 10/2010 | Hall et al. | 307/104 |
| 2010/0277121 | A1* | 11/2010 | Hall et al. | 320/108 |
| 2010/0308939 | A1* | 12/2010 | Kurs | 333/219.2 |
| 2010/0327661 | A1* | 12/2010 | Karalis et al. | 307/104 |
| 2011/0043047 | A1* | 2/2011 | Karalis et al. | 307/104 |
| 2011/0043048 | A1* | 2/2011 | Karalis et al. | 307/104 |
| 2011/0043049 | A1* | 2/2011 | Karalis et al. | 307/104 |
| 2011/0051638 | A1* | 3/2011 | Jeon et al. | 370/311 |
| 2011/0074218 | A1* | 3/2011 | Karalis et al. | 307/104 |
| 2011/0074347 | A1* | 3/2011 | Karalis et al. | 320/108 |
| 2011/0080051 | A1* | 4/2011 | Lee et al. | 307/104 |
| 2011/0081857 | A1* | 4/2011 | Lee et al. | 455/41.1 |
| 2011/0089895 | A1* | 4/2011 | Karalis et al. | 320/108 |
| 2011/0095617 | A1* | 4/2011 | Cook et al. | 307/104 |
| 2011/0095618 | A1* | 4/2011 | Schatz et al. | 307/104 |
| 2011/0133655 | A1* | 6/2011 | Recker et al. | 315/159 |
| 2011/0148219 | A1* | 6/2011 | Karalis et al. | 307/104 |
| 2011/0190587 | A1* | 8/2011 | Uchimura et al. | 600/173 |
| 2011/0193419 | A1* | 8/2011 | Karalis et al. | 307/104 |
| 2011/0227528 | A1* | 9/2011 | Karalis et al. | 320/108 |
| 2011/0227530 | A1* | 9/2011 | Karalis et al. | 320/108 |
| 2011/0241618 | A1* | 10/2011 | Karalis et al. | 320/108 |
| 2011/0273025 | A1* | 11/2011 | Amano et al. | 307/104 |
| 2012/0068549 | A1* | 3/2012 | Karalis et al. | 307/104 |
| 2012/0146425 | A1* | 6/2012 | Lee et al. | 307/104 |
| 2012/0153732 | A1* | 6/2012 | Kurs et al. | 307/104 |
| 2012/0153733 | A1* | 6/2012 | Schatz et al. | 307/104 |
| 2012/0153734 | A1* | 6/2012 | Kurs et al. | 307/104 |
| 2012/0153735 | A1* | 6/2012 | Karalis et al. | 307/104 |
| 2012/0153736 | A1* | 6/2012 | Karalis et al. | 307/104 |
| 2012/0153737 | A1* | 6/2012 | Karalis et al. | 307/104 |
| 2012/0153738 | A1* | 6/2012 | Karalis et al. | 307/104 |
| 2012/0161537 | A1* | 6/2012 | Kamata | 307/104 |
| 2012/0163619 | A1* | 6/2012 | Kinoshita et al. | 381/77 |
| 2012/0175967 | A1* | 7/2012 | Dibben et al. | 307/104 |
| 2012/0235505 | A1* | 9/2012 | Schatz et al. | 307/104 |
| 2012/0280765 | A1* | 11/2012 | Kurs et al. | 333/175 |
| 2012/0287835 | A1* | 11/2012 | Jeon et al. | 370/311 |
| 2012/0313449 | A1* | 12/2012 | Kurs et al. | 307/104 |
| 2013/0057364 | A1* | 3/2013 | Kesler et al. | 333/219.2 |
| 2013/0119774 | A1* | 5/2013 | Ichikawa | 307/104 |
| 2013/0175875 | A1* | 7/2013 | Kurs et al. | 307/104 |
| 2013/0200716 | A1* | 8/2013 | Kesler et al. | 307/104 |
| 2013/0278073 | A1* | 10/2013 | Kurs et al. | 307/104 |
| 2013/0278074 | A1* | 10/2013 | Kurs et al. | 307/104 |
| 2013/0278075 | A1* | 10/2013 | Kurs et al. | 307/104 |
| 2013/0300353 | A1* | 11/2013 | Kurs et al. | 320/108 |
| 2013/0300355 | A1* | 11/2013 | Jung | 320/108 |
| 2013/0334892 | A1* | 12/2013 | Hall et al. | 307/104 |
| 2014/0111031 | A1* | 4/2014 | Lee et al. | 307/149 |
| 2014/0111156 | A1* | 4/2014 | Lee et al. | 320/108 |
| 2014/0167523 | A1* | 6/2014 | Tamaki et al. | 307/104 |
| 2014/0175898 | A1* | 6/2014 | Kurs et al. | 307/104 |

FOREIGN PATENT DOCUMENTS

| | | | |
|---|---|---|---|
| JP | A-2001-258182 | 9/2001 | |
| JP | A-2001-309578 | 11/2001 | |
| KR | 10-2005-0105200 | 11/2005 | |
| KR | 10-2007-0017530 | 2/2007 | |
| WO | WO 2005/109597 A1 | 11/2005 | |
| WO | WO 2005/109598 A1 | 11/2005 | |
| WO | WO 2007/008646 A2 | 1/2007 | |
| WO | WO 2008/114268 A2 | 9/2008 | |
| WO | WO 2010055381 A1 * | 5/2010 | H02J 5/00 |

OTHER PUBLICATIONS

Wireless Power Planet, "The Future of Wireless Power", Mar. 29, 2011, Retrieved from the Internet at "www.wirelesspowerplanet.com/news/the-future-of-wireless-power".*

(56) References Cited

OTHER PUBLICATIONS

International Search Report in International Application No. PCT/IB2009/007282; dated Mar. 1, 2010.
Written Opinion of the International Searching Authority in International Application No. PCT/IB2009/007282; dated Mar. 1, 2010.
Jul. 31, 2012 Korean Office Action issued in Korean Application No. 10-2011-7010748 (with translation).
May 10, 2012 Search Report issued in European Patent Application No. 11179251.1.

* cited by examiner

CONTROLLING THE WIRELESS TRANSMISSION OF POWER BASED ON THE EFFICIENCY OF POWER TRANSMISSIONS

BACKGROUND OF THE INVENTION

1. Field of the Invention

The invention relates to a power supply system and a control method thereof. More particularly, the invention relates to a countermeasure for an obstruction near a system that contactlessly supplies power.

2. Description of the Related Art

Figure 13:
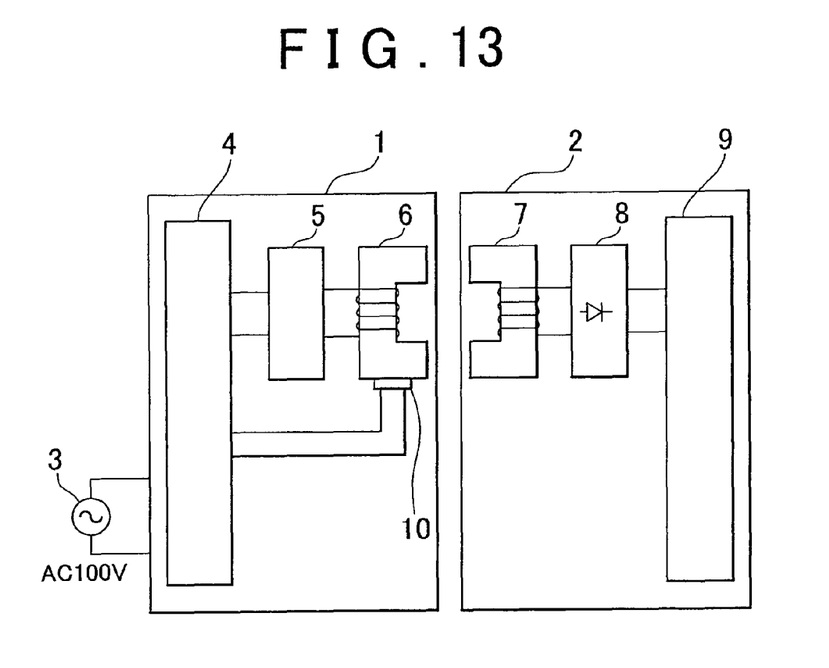
FIG. 13 is a block diagram of an apparatus according to related art.

A non-contact power supply system that uses electromagnetic induction is known. For example, Japanese Patent Application Publication No. 2001-258182 (JP-A-2001-258182) describes one such a non-contact power transmitting apparatus. FIG. 13 shows the structure of this related art. This power transmitting apparatus contactlessly supplies power between a main body 1 that has a first coil 6 which receives power supplied from a commercial power supply, and a terminal 2 that has a second coil 7 which is coupled by electromagnetic induction to the first coil 6. A temperature increase preventing device which automatically stops the supply of power to the terminal 2 when a temperature equal to or greater than a predetermined temperature is detected is provided in the main body 1.

In this power transmitting apparatus, the supply of power is stopped in response to an increase in temperature. However, if an object or a person approaches the power transmitting apparatus while power is contactlessly being supplied, this is unable to be detected. That is, when using a non-contact power supply system with a facility such as a power supply station as the power transmitting side and a movable body such as a vehicle as the power receiving side, and power is contactlessly supplied to the movable body, it is possible that an occupant of a vehicle or the like may come near the power supply system, in which case it is desirable to quickly stop supplying power.

SUMMARY OF THE INVENTION

The invention provides a system and control method thereof, which is capable of quickly detecting when an obstruction such as a person or an object is present, and controlling the power supply state accordingly.

A first aspect of the invention relates to a power supply system provided with power transmitting means and power receiving means for contactlessly receiving power from the power transmitting means. This power supply system includes efficiency detecting means for detecting transmitting efficiency between the power transmitting means and the power receiving means while power is being transmitted from the power transmitting means to the power receiving means; determining means for determining whether the transmitting efficiency detected by the efficiency detecting means is equal to or greater than a specified value; and controlling means for, if the transmitting efficiency is less than the specified value, temporarily stopping power from being transmitted from the power transmitting means and then starting to transmit power again with a minute power after a specified period of time has passed. The determining means determines whether the transmitting efficiency after power has started to be transmitted again with the minute power is equal to or greater than the specified value. If the transmitting efficiency determined by the determining means is equal to or greater than the specified value, the controlling means starts to transmit power again with regular power from the power transmitting means, and if the transmitting efficiency is less than the specified value, the controlling means temporarily stops power from being transmitted from the power transmitting means and then starts to transmit power again with the minute power after the specified period of time has passed.

The power supply system described above may also include resonant frequency detecting means for detecting a resonant frequency of the power transmitting means and a resonant frequency of the power receiving means, and frequency adjusting means for adjusting the resonant frequency of the power transmitting means and the resonant frequency of the power receiving means when the detected resonant frequency is off from a specified frequency.

In the structure described above, the frequency adjusting means may finish adjusting the resonant frequency of the power receiving means before power starts to be supplied from the power transmitting means.

In the structure described above, the regular power may be power that is equal to or greater than the minute power.

In the structure described above, the minute power may be one hundredth of the regular power.

The power supply system described above may also include storing means for storing power received by the power receiving means.

The power supply system described above may also include frequency characteristic detecting means for detecting a frequency characteristic of the transmitting efficiency, and position ascertaining means for ascertaining the position of an obstruction between or near the power transmitting means and the power receiving means according to the frequency characteristic.

Also, the power supply system may further include frequency characteristic detecting means for determining a frequency characteristic of the transmitting efficiency, and position ascertaining means for ascertaining the position of a coil of the power transmitting means and the position of a coil of the power receiving means according to the frequency characteristic.

In the structure described above, the position ascertaining means may ascertain the position of the coil of the power transmitting means and the position of the coil of the power receiving means according to the frequency characteristic.

The power supply system described above may also include position adjusting means for adjusting the position of at least one of the coils if the position of the at least one of the coils ascertained by the position ascertaining means is off.

A second aspect of the invention relates to a power supply system provided with power transmitting means, power receiving means for contactlessly receiving power from the power transmitting means, and controlling means for controlling the transmission of power from the power transmitting means. This power supply system includes efficiency detecting means for detecting transmitting efficiency between the power transmitting means and the power receiving means while power is being transmitted from the power transmitting means to the power receiving means, and determining means for determining whether the transmitting efficiency detected by the efficiency detecting means is equal to or greater than a specified value. The controlling means temporarily stops power from being transmitted from the power transmitting means if the transmitting efficiency is less than the specified value, and continues to transmit power from the power transmitting means if the transmitting efficiency is equal to or greater than the specified value.

In the structure described above, the controlling means may start to transmit power again with a minute power after a specified period of time has passed after temporarily stopping power from being transmitted from the power transmitting means, and the controlling means may determine whether the transmitting efficiency after starting to transmit power again with the minute power is equal to or greater than the specified value. If the transmitting efficiency is equal to or greater than the specified value, the controlling means may start to transmit power again with regular power from the power transmitting means, and if the transmitting efficiency is less than the specified value, the controlling means may temporarily stop power from being transmitted from the power transmitting means and then start to transmit power again with the minute power after the specified period of time has passed.

A third aspect of the invention relates to a control method of a power supply system provided with power transmitting means, power receiving means for contactlessly receiving power from the power transmitting means, and controlling means for controlling the transmission of power from the power transmitting means. This control method includes detecting transmitting efficiency between the power transmitting means and the power receiving means while power is being transmitted from the power transmitting means to the power receiving means; determining whether the transmitting efficiency detected by the efficiency detecting means is equal to or greater than a specified value; and temporarily stopping power from being transmitted from the power transmitting means if the transmitting efficiency is less than the specified value, and continuing to transmit power from the power transmitting means if the transmitting efficiency is equal to or greater than the specified value.

The control method described above may also include starting to transmit power again with a minute power after a specified period of time has passed after temporarily stopping power from being transmitted if the transmitting efficiency is less than the specified value; determining whether the transmitting efficiency after starting to transmit power again with the minute power is equal to or greater than the specified value; and if the transmitting efficiency is equal to or greater than the specified value, starting to transmit power again with regular power from the power transmitting means, and if the transmitting efficiency is less than the specified value, temporarily stopping power from being transmitted from the power transmitting means and then starting to transmit power again with the minute power after the specified period of time has passed.

The aspects described above make it possible to quickly detect when an obstruction such as a person or an object is present, and control the supply of power accordingly.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF EMBODIMENTS

Figure 1:
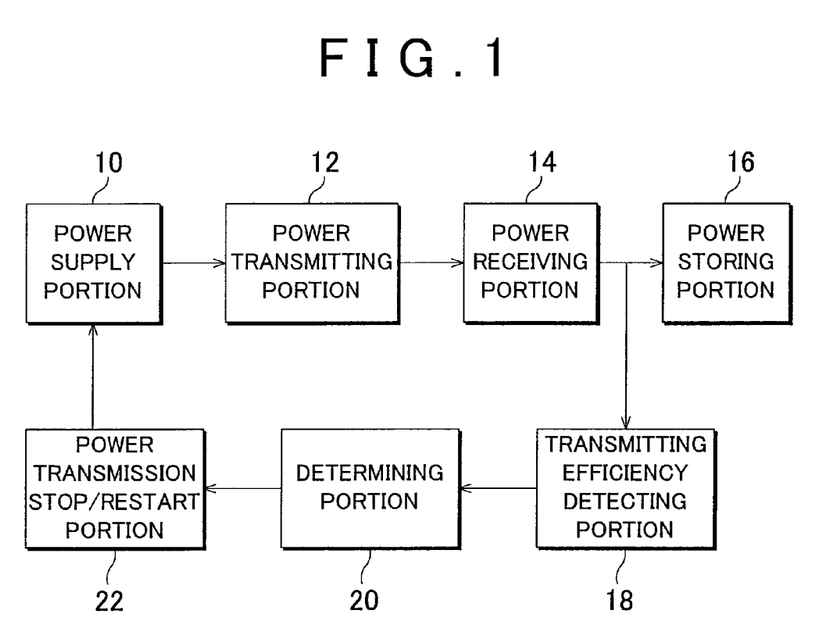
FIG. 1 is a configuration block diagram of a first example embodiment of the invention.

FIG. 1 is a configuration block diagram of a power supply system according to the first example embodiment of the invention. Power from a power supply portion 10 such as a commercial power supply is supplied to a power transmitting portion 12.

The power transmitting portion 12 is formed by a power transmitting coil and a power transmitting side resonance coil.

A power receiving portion 14 is formed by a power receiving coil and a power receiving side resonance coil, and is coupled to the power transmitting side by electromagnetic field resonance. Power is transmitted and received without contact between the power transmitting portion 12 and the power receiving portion 14. The power receiving portion 14 supplies the power received from the power transmitting portion 12 to a power storing portion 16.

The power storing portion 16 rectifies the power from the power receiving portion 14 and supplies it to a secondary battery to charge the secondary battery.

A transmitting efficiency detecting portion 18 detects the power transmitting efficiency between the power transmitting portion 12 and the power receiving portion 14. The transmitting efficiency detecting portion 18 supplies the detected efficiency to a determining portion 20.

The determining portion 20 compares the efficiency detected by the transmitting efficiency detecting portion 18 with a predetermined reference value. If the efficiency is equal to or greater than the predetermined reference value, the determining portion 20 determines that power should continue to be supplied as it is. If, on the other hand, the efficiency is less than the predetermined reference value, the determining portion 20 determines that the regular supply of power is being obstructed by an obstruction or the like and power should stop being supplied. The determining portion 20 supplies the determination result from this comparison to a power transmission stop/restart portion 22.

The power transmission stop/restart portion (power transmission control portion) 22 controls the operation of the power supply portion 10 according to the determination result from the determining portion 20. That is, if the determination result indicates that power should continue to be supplied as it is, the power transmission stop/restart portion (power transmission control portion) 22 keeps the power supply portion 10 operating as it is. If, on the other hand, the determination result indicates that power should stop being supplied, the power transmission stop/restart portion (power transmission control portion) 22 stops the supply of power to the power transmitting portion 12 by stopping the power supply portion 10. Also, if the supply of power is stopped, the power transmitting stop/restart portion 22 instructs the power supply portion 10 to transmit a minute power in a certain frequency range to the power transmitting portion 12 after a specified period of time has passed from the time the supply of power was stopped.

In response, the power supply portion 10 supplies a minute power in a certain frequency range to the power transmitting portion 12 as instructed. The power receiving portion 14 receives this minute power, and the transmitting efficiency detecting portion 18 detects the transmitting efficiency at this time.

The reason a minute power is transmitted is to detect whether the obstruction such as a person or an object is still present, and if the person or object is still present, to keep the effect on that person or object to a minimum. The minute power is such a power that is minute as compared to a regular power that will be described later. For example, the minute power may be one hundredth of the regular power. The amount of the minute power and the regular power is not limited to this embodiment.

The determining portion 20 compares the detected efficiency when the minute power is supplied with a predetermined reference value. If the efficiency is equal to or greater than the reference value, the determining portion 20 determines that the obstruction is no longer present. If, on the other hand, the efficiency is less than the reference value, the determining portion 20 determines that the obstruction is still present and that the supply of power should remain stopped.

If the determination result from the determining portion 20 indicates that the power should start to be supplied again, the power transmission stop/restart portion 22 instructs the power supply portion 10 to start transmitting the regular amount of power. If, on the other hand, the determination result from the determining portion 20 indicates that the supply of power should remain stopped, the power transmission stop/restart portion 22 instructs the power supply portion 10 to stop transmitting the minute power.

In FIG. 1, the power supply portion 10, the power transmitting portion 12, and the power transmission stop/restart portion 22 are provided on the facility side, such as in a power supply station, while the power receiving portion 14, the power storing portion 16, the transmitting efficiency detecting portion 18, and the determining portion 20 are provided in a movable body such as a vehicle. Of course, the transmitting efficiency detecting portion 18 and the determining portion 20 may instead be provided on the facility side.

The transmitting efficiency detecting portion 18, the determining portion 20, and the power transmission stop/restart portion 22 are formed by microcomputers. The secondary battery of the power storing portion 16 may be an on-board secondary battery such as a nickel-metal-hydride battery or a lithium-ion battery.

Also, a detecting portion that detects the state-of-charge (SOC) of the secondary battery may be provided in the power storing portion 16, and this detecting portion may instruct the power transmission stop/restart portion 22 to stop transmitting power when it detects that the secondary battery is fully charged.

Further, the power transmission stop/restart portion 22 may be instructed to start or stop transmitting power according to a manual operation on the movable body side, e.g., in the vehicle.

Figure 2:
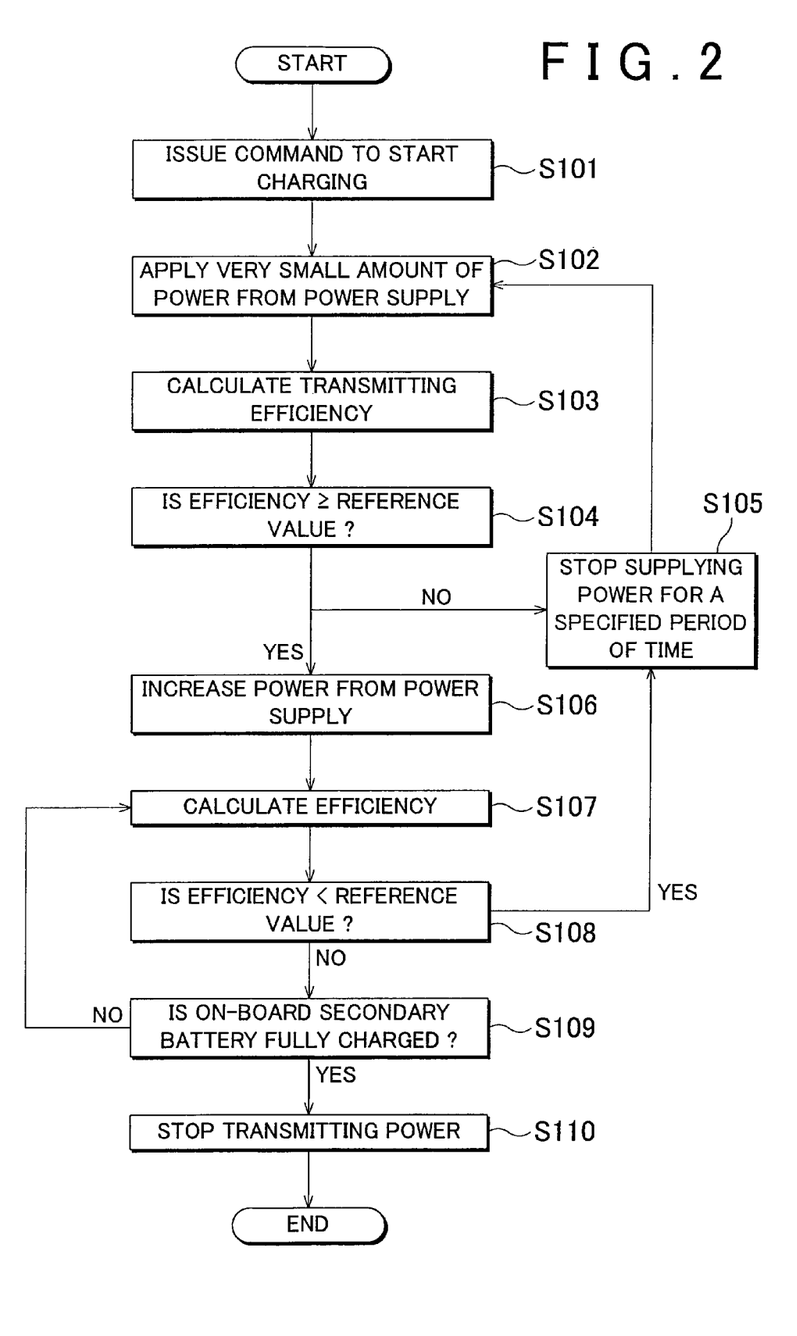
FIG. 2 is a flowchart of a routine according to the first example embodiment.

FIG. 2 is a flowchart of a routine according to this example embodiment. When a vehicle is stopped in a predetermined location at a power supply station and the power receiving coil or the power receiving side resonance coil of the power receiving portion 14 in the vehicle comes to be in a position substantially opposite the power transmitting coil or the power transmitting side resonance coil of the power transmitting portion 12, the occupant of the vehicle pushes a button in the vehicle or on the power supply station to start charging (S101). In response to this command to start charging, the power transmission stop/restart portion 22 instructs the power supply portion 10 to supply a minute power.

In response, the power supply portion 10 applies a minute power to the power transmitting portion 12 (S102). The minute power is applied from the power transmitting portion 12 to the power receiving portion 14 by electromagnetic field resonance.

Next, the transmitting efficiency detecting portion 18 calculates the transmitting efficiency from the power transmitted by the power transmitting portion 12 and the power received by the power receiving portion 14 (S103).

Next, the determining portion 20 determines whether the efficiency is high or low by comparing the efficiency calculated by the transmitting efficiency detecting portion 18 with a predetermined reference value (S104). If the efficiency is equal to or greater than the reference value, the determining portion 20 determines that the efficiency is high (i.e., YES in step S104), and supplies this determination result to the power transmission stop/restart portion 22, which then increases the power transmitted from the power supply portion 10 to the regular power (S106). If, on the other hand, the efficiency is less than the reference value, the determining portion 20 determines that the efficiency is low (i.e., NO in step S104), and supplies this determination result to the power transmission stop/restart portion 22, which then instructs the power supply portion 10 to stop supplying power for a specified period of time (S105). The power supply portion 10 then stops supplying power to the power transmitting portion 12 for the specified period of time, as instructed. Then after the specified period of time has passed, the power supply portion 10 starts to transmit a minute power again in response to a command from the power transmission stop/restart portion 22 (S102).

After the power from the power supply portion 10 is increased to the regular power in step S106, the transmitting efficiency detecting portion 18 calculates the efficiency (S107).

Then, the determining portion 20 compares the calculated efficiency with a predetermined reference value, and determines whether to stop supplying power (S108). That is, if the calculated efficiency is less than the reference value, the determining portion 20 determines that the supply of power should be stopped, and the power transmission stop/restart portion 22 stops supplying power for the specified period of time (S105). If, on the other hand, the efficiency is equal to or greater than the reference value, the power transmission stop/restart portion 22 continues to supply power as it is (in which case the process proceeds on to steps S109 and thereafter).

The power storing portion 16 rectifies the power from the power receiving portion 14 and uses it to charge the on-board secondary battery. The power storing portion 16 also determines the state-of-charge (SOC) of the on-board secondary battery (S109). If the on-board secondary battery is not yet fully charged (i.e., NO in step S109), the power storing portion 16 continues to charge the on-board secondary battery and calculates the efficiency (S107 and S108). If the on-board secondary battery is fully charged, the power storing portion 16 instructs the power transmission stop/restart portion 22 to stop transmitting power (S110).

In this way, according to this example embodiment, a minute power is first transmitted and the efficiency is detected. If the efficiency is high such that it is determined that no obstruction is present, power is increased to the regular power and transmitted such that the on-board secondary battery is charged efficiently. If, on the other hand, the efficiency is low when the minute power is transmitted, it is determined that an obstruction is present so power stops being transmitted. Then after a specified period of time, a very small amount is power starts to be transmitted again to detect whether the obstruction is still present. As a result, if an obstruction is detected, power can stop being transmitted quickly, and if the obstruction is no longer present, power can start to be transmitted again quickly, so the on-board secondary battery can be charged efficiently.

Figure 3:
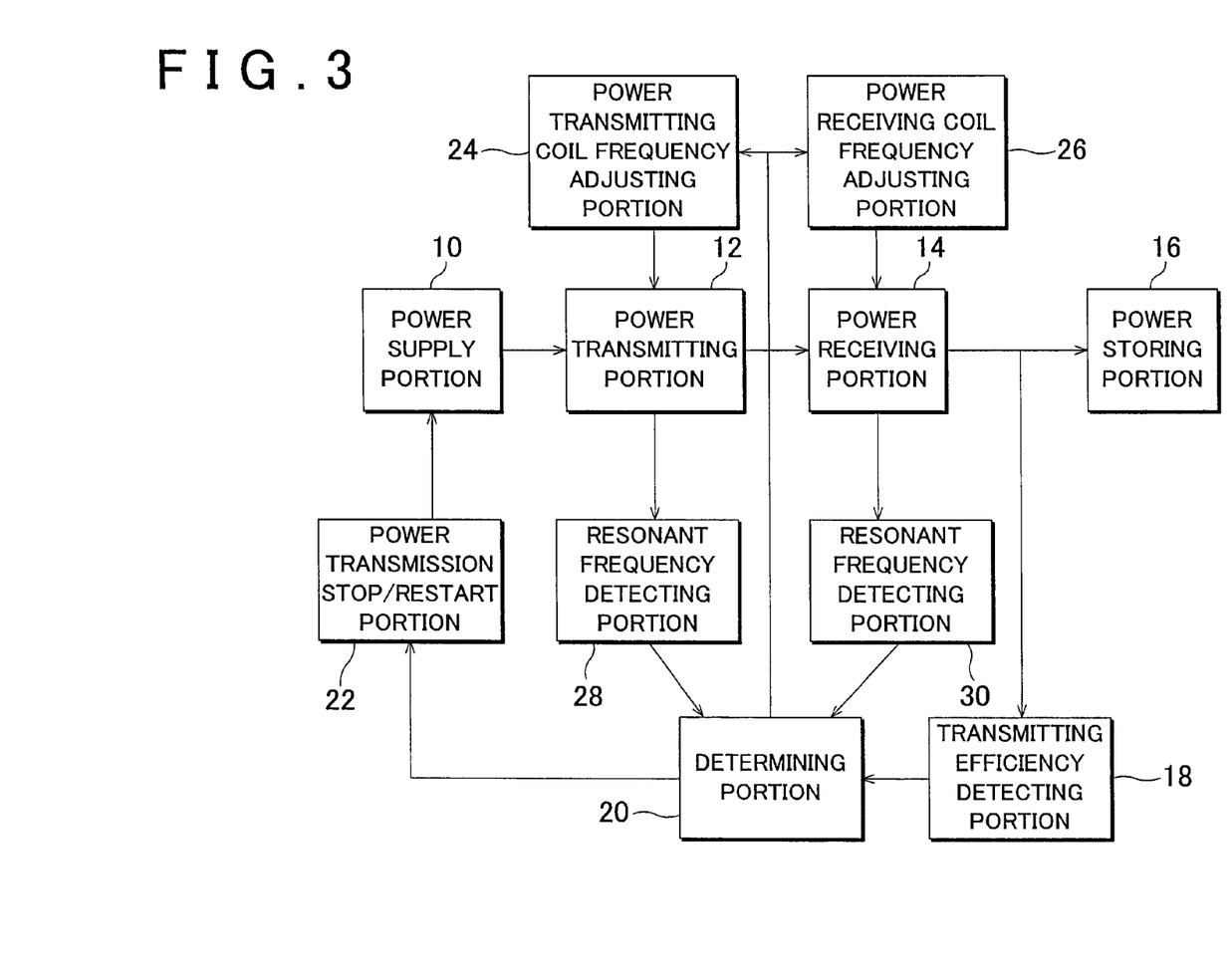
FIG. 3 is a configuration block diagram of a second example embodiment of the invention.

FIG. 3 is a configuration block diagram of a second example embodiment of the invention. In addition to the structure shown in FIG. 1, the power supply system also has a power transmitting coil frequency adjusting portion 24, a power receiving coil frequency adjusting portion 26, a resonant frequency detecting portion 28, and a resonant frequency detecting portion 30.

The power transmitting coil frequency adjusting portion 24 adjusts the frequency of the power transmitting coil of the power transmitting portion 12, and the power receiving coil frequency adjusting portion 26 adjusts the frequency of the power receiving coil of the power receiving portion 14.

The resonant frequency detecting portion 28 detects the resonant frequency of the power transmitting portion 12, and the resonant frequency detecting portion 30 detects the resonant frequency of the power receiving portion 14. The detected resonant frequencies are then supplied to the determining portion 20.

The determining portion 20 executes the determination routine described in the first example embodiment described above, and instructs the power transmitting coil frequency adjusting portion 24 to adjust the resonant frequency of the power transmitting coil of the power transmitting portion 12 according to the detected resonant frequency, as well as instructs the power receiving coil frequency adjusting portion 26 to adjust the resonant frequency of the power receiving coil of the power receiving portion 14 according to the detected resonant frequency.

Figure 4:
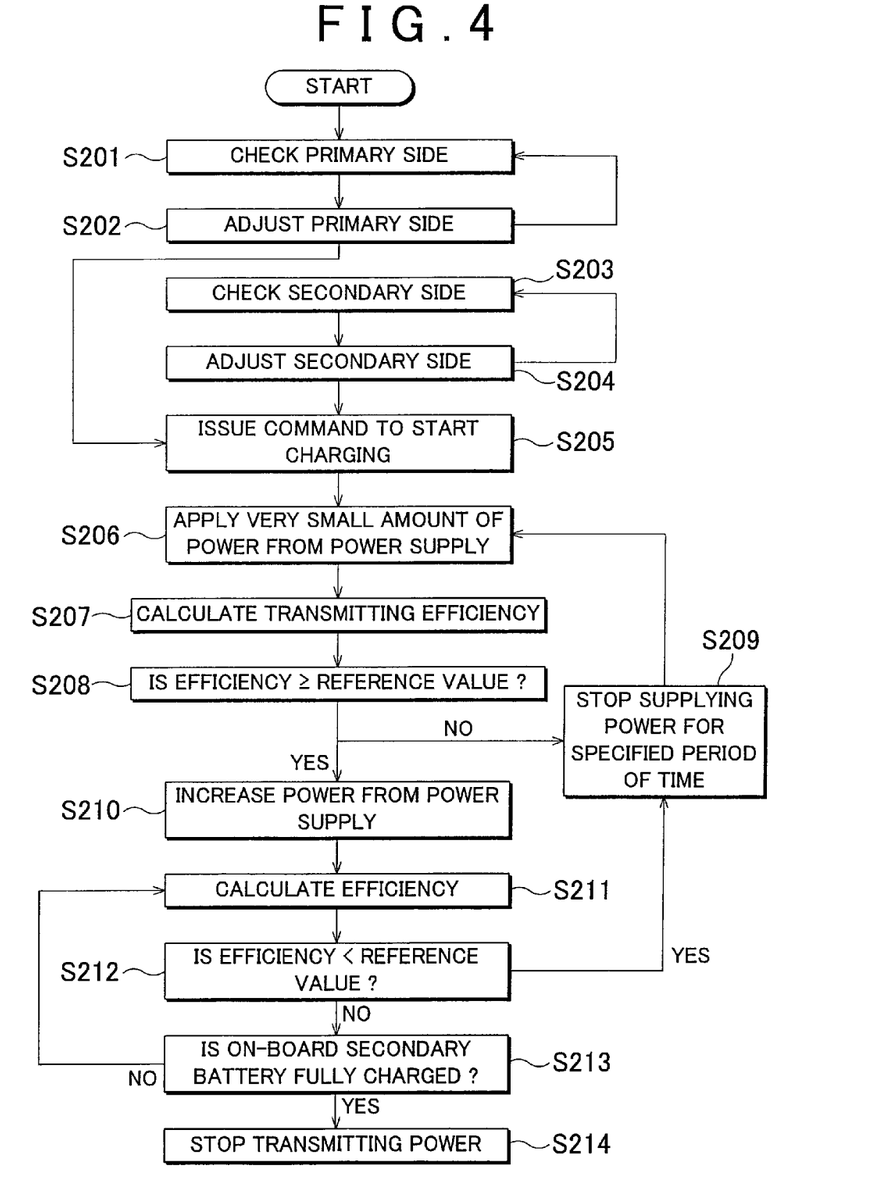
FIG. 4 is a flowchart of a routine according to the second example embodiment.

FIG. 4 is a flowchart of the routine according to this example embodiment. First, the resonant frequency of a primary coil (either the power transmitting coil or the power transmitting side resonance coil) is checked on a primary side, i.e., on the power transmitting side of the power supply station (S201). This check is performed to determine whether the resonant frequency of the primary coil is equal to a reference value by supplying a minute power from the power supply portion 10 and detecting the frequency characteristic of the voltage and current of the primary coil or the reflection amount at that time, using the resonant frequency detecting portion 28.

If the resonant frequency of the primary coil is off from the reference value, the power transmitting coil frequency adjusting portion 24 changes the length of the primary coil or adjusts the variable inductance L and capacitance C that are added to the primary coil so that the resonant frequency comes to within a specified value of the reference value (S202).

Steps S201 and S202 are repeatedly executed periodically when charging is not being performed or during "open time" when the vehicle is not stopped in the predetermined location at the power supply station.

A similar process is also performed on the vehicle side. That is, it is determined whether the resonant frequency of a secondary coil (either the power receiving coil or the power receiving side resonant coil) is equal to a reference value by supplying a minute power to the secondary coil when charging is not being performed, and detecting the frequency characteristic of the voltage and current of the secondary coil or the reflection amount at that time, using the resonant frequency detecting portion 30. If the resonant frequency is off from the reference value by more than a specified value, the power receiving coil frequency adjusting portion 26 changes the length of the secondary coil or adjusts the variable inductance L and capacitance C that are added to the secondary coil so that the resonant frequency comes to within a specified value of the reference value (S203 and S204). Incidentally, power from the power supply portion 10 is unable to be used at this time, so power from the on-board secondary battery or the like is used. That is, the power storing portion 16 converts the DC (direct current) power from the on-board secondary battery into AC (alternating current) power and supplies it to the secondary coil.

After the resonant frequencies of the primary coil and secondary coil are adjusted as described above, a power supply routine similar to that shown in FIG. 2 is executed (S205 to S214).

According to this example embodiment, power is supplied after adjusting the resonant frequencies so even if the efficiency decreases, it is clear that this decrease in efficiency is caused not by an internal factor such as the resonant frequency being off, but by an external factor from an obstruction such as a person or an object. Accordingly, the supply of power can be quickly stopped and restarted according to whether an obstruction is present.

Figure 5:
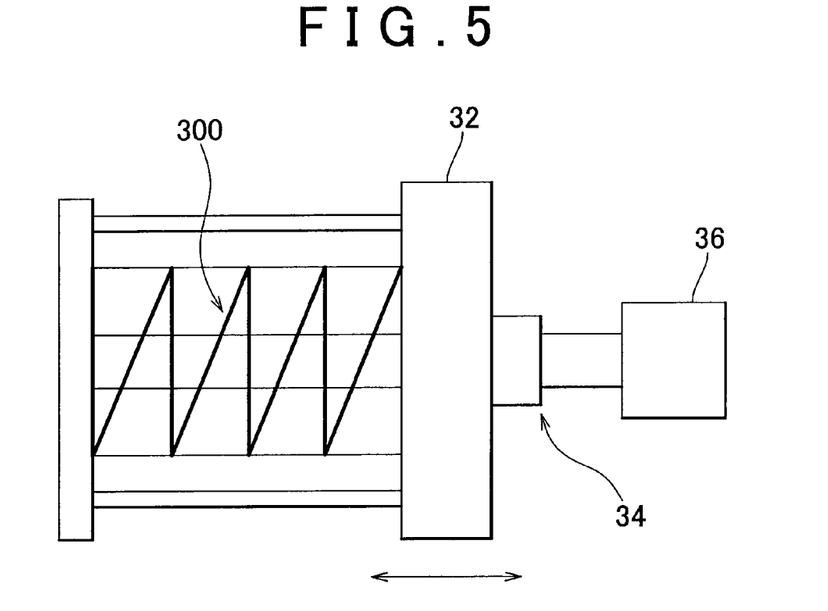
FIG. 5 is a block diagram of a coil length varying device.

FIG. 5 is a block diagram of an example coil structure for adjusting the resonant frequency of the primary coil. A similar coil structure may also be employed for the secondary coil. In the following description, the resonant frequency is adjusted by changing the length of the coil. As shown in the drawing, a primary coil 300 is provided in a support 32. The coil length is changed by moving this support 32 in the longitudinal direction of the coil using a ball screw 34 and a motor 36. Of course another structure may instead be used for the coil structure.

In this example embodiment, the presence of an obstruction is detected using the fact that the transmitting efficiency decreases when an obstruction is present between the power transmitting portion 12 and the power receiving portion 14. This is based on the fact that the frequency response characteristic of the transmitting efficiency changes when an object is between or near the power transmitting portion 12 and the power receiving portion 14.

Figure 6:
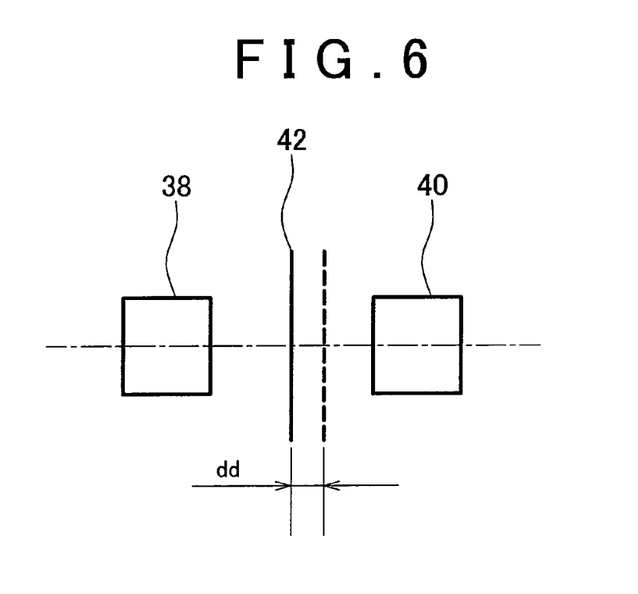
FIG. 6 is a diagram illustrating the positional relationship between resonance coils and a steel sheet.
Figure 7:
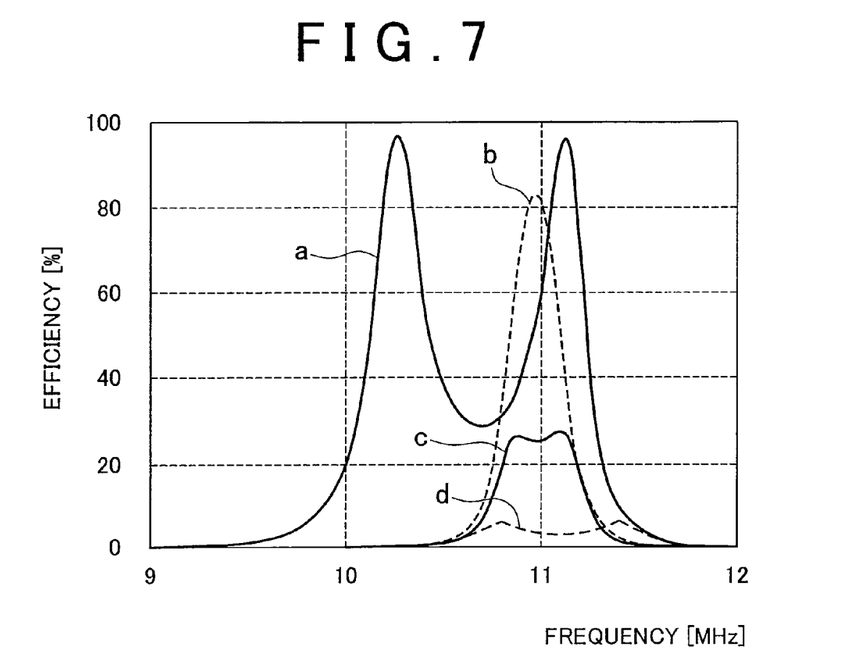
FIG. 7 is a frequency characteristic diagram of the efficiency in the case illustrated in FIG. 6.
Figure 8:
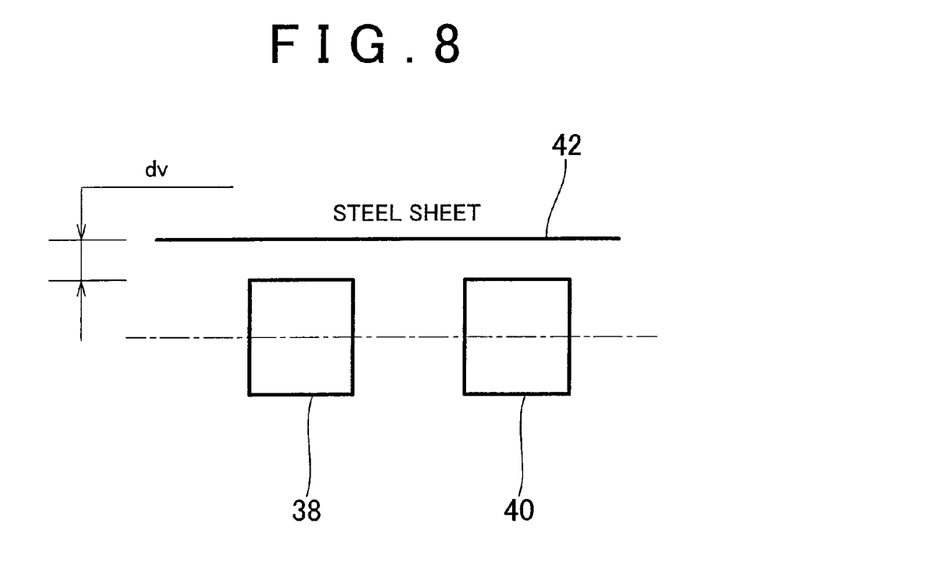
FIG. 8 is another diagram illustrating the positional relationship between the resonance coils and the steel sheet.
Figure 9:
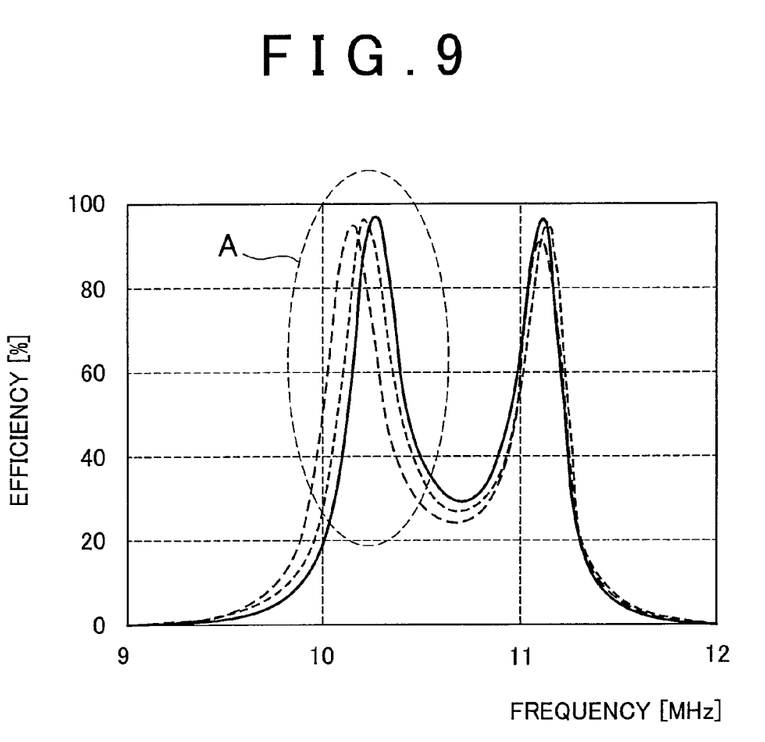
FIG. 9 is a frequency characteristic diagram of the efficiency in the case illustrated in FIG. 8.
Figure 10:
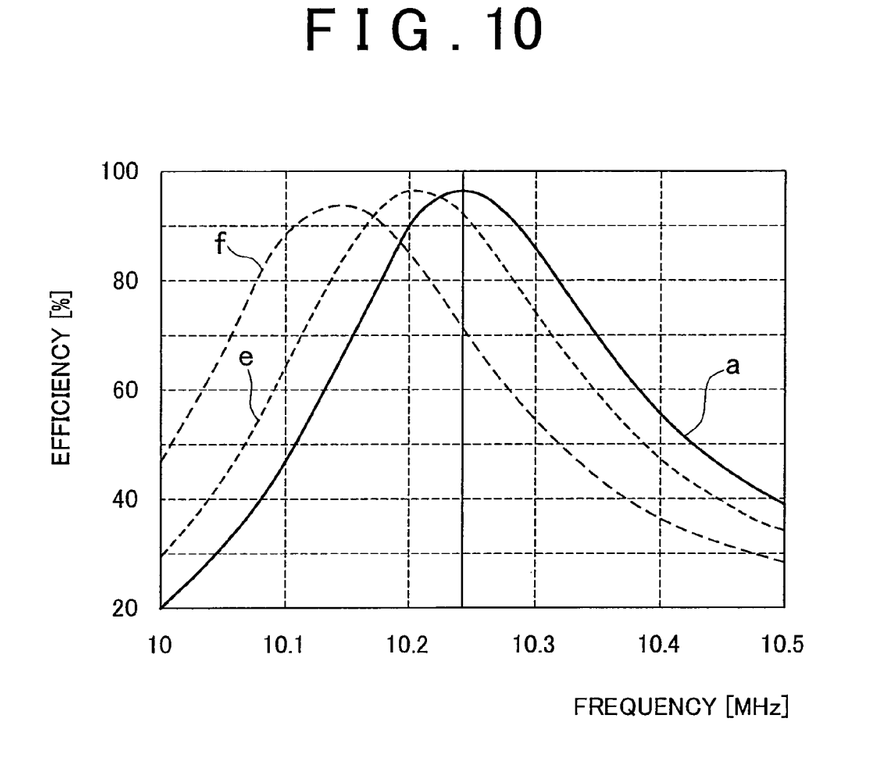
FIG. 10 is a partial expanded view of FIG. 9.

FIG. 6 shows a case in which a steel sheet 42 has been inserted between a power transmitting side resonant coil 38 of the power transmitting portion 12 and a power receiving side resonance coil 44 of the power receiving portion 14. FIG. 7 shows the frequency characteristic of the efficiency in this case. Also, FIG. 8 shows a case in which the steel sheet 42 is near the resonant coils 38 and 40, and FIGS. 9 and 10 show the frequency characteristic of the efficiency in this case. FIG. 10 is an expanded view of portion A in FIG. 9.

FIGS. 7 and 10 show several different graphs, i.e., graph a, graph b, graph c, graph d, graph e, and graph f. These are cases in which the steel sheet 42 has been displaced from a reference position by an amount dd in FIG. 6, and the steel sheet 42 has been displaced from a reference position by an amount dv in FIG. 8. The amount dd is the amount that the steel sheet 42 has been offset from the reference position between the resonant coils 38 and 40, and the amount dv is the amount that the steel sheet 42 has been offset from the resonant coils 38 and 40 in a direction perpendicular to the direction in which the coil axes lie. Graph a shows the efficiency characteristic when the steel sheet 42 is not present as a reference. Graph b shows a case in which the amount dd is 0 cm, graph c shows a case in which the amount dd is 5 cm, graph d shows a case in which the amount dd is 10 cm, graph e shows a case in which the amount dv is 5 cm, and graph f shows a case in which the amount dv is 10 cm.

Referring to FIG. 7, it is evident that at a frequency at which the frequency characteristic of the efficiency greatly changes when there is an obstruction such as a steel sheet and almost 100% efficiency can be obtained when there is no such obstruction, the efficiency decreases to approximately 0% when the obstruction is present.

In FIG. 10 as well, the efficiency when there is an obstruction near the resonant coils is less than when there is no obstruction. It is also evident that the frequency characteristic of the efficiency changes depending to the position of the obstruction. Therefore, by detecting the frequency characteristic of the efficiency instead of simply detecting a decrease in the efficiency, it is possible to not only determine whether an obstruction is present, but also determine to some degree the position of an obstruction when one is present. Accordingly, the position of an obstruction can be ascertained and the occupant of the vehicle or the like notified.

Figure 11:
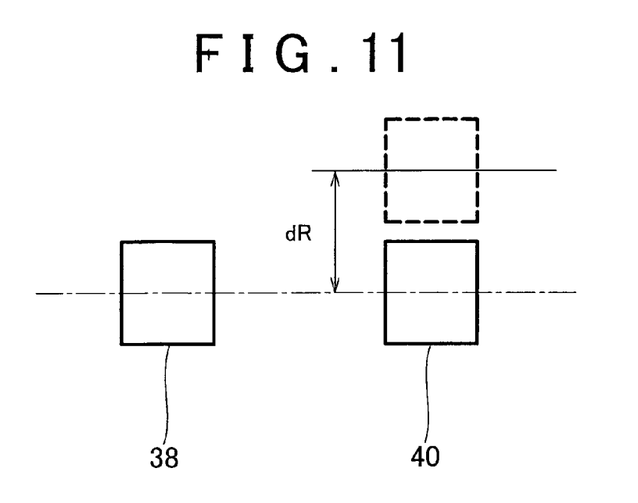
FIG. 11 is a diagram illustrating the positional relationship between the resonance coils.
Figure 12:
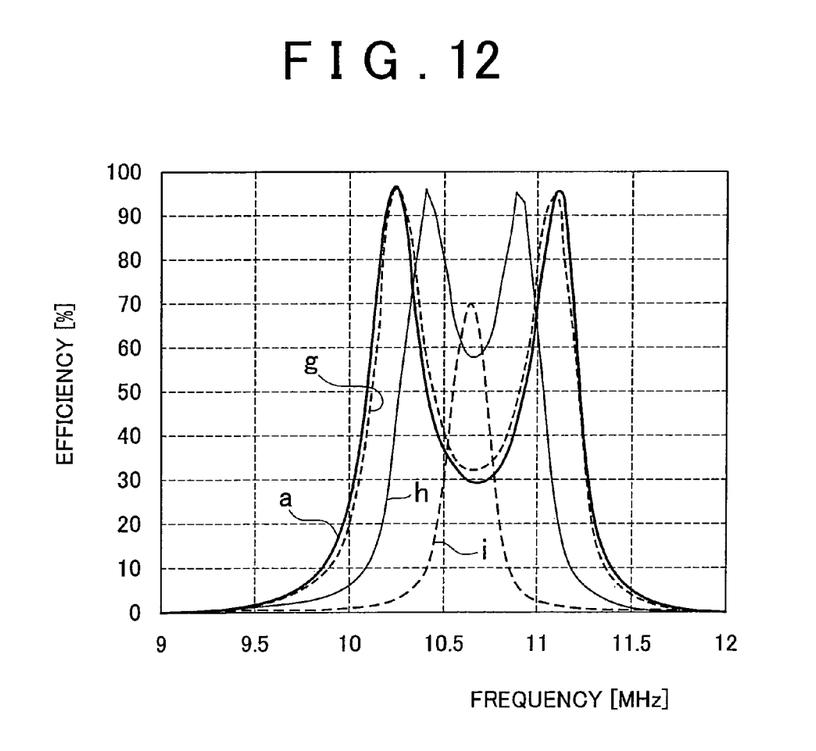
FIG. 12 is a frequency characteristic diagram of the efficiency in the case illustrated in FIG. 11.

FIG. 11 shows a case in which the center positions of the resonant coils 38 and 40 are offset from one another, and FIG. 12 shows the frequency characteristic of the efficiency in this case. In FIG. 12, graph g shows a case in which the offset dR from the center position in FIG. 11 is 10 cm, graph h shows a case in which the offset dR from the center position in FIG. 11 is 30 cm, and graph i shows a case in which the offset dR from the center position in FIG. 11 is 60 cm. Graph a shows a case in which there is no offset. As is evident from the drawing, the efficiency also decreases when the center positions of the coils are offset from one another, but the frequency characteristic of the efficiency is different from both that shown in FIG. 7 and that shown in FIG. 9. This means that it is possible to distinguish between a case in which an obstruction is present and a case in which the center positions of the coil are offset from each other, by detecting the frequency response characteristic. Therefore, a frequency characteristic detecting portion and a coil position adjusting portion may be additionally provided to the structure shown in FIG. 3, for example. The frequency characteristic of the efficiency may be detected by transmitting a minute power while changing the frequency, and the detecting portion 20 may detect the cause of a decrease in efficiency based on the detection result. If the determining portion 20 determines that the center position of the coil is offset, the coil position adjusting portion may adjust the coil position.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A power supply system comprising:
a power transmitting portion;
a power receiving portion that contactlessly receives power from the power transmitting portion;
a controlling portion that controls the transmission of power from the power transmitting portion;
an efficiency detecting portion that detects transmitting efficiency between the power transmitting portion and the power receiving portion while power is being transmitted from the power transmitting portion to the power receiving portion; and
a determining portion that determines whether the transmitting efficiency detected by the efficiency detecting portion is equal to or greater than a predetermined reference value by comparing the transmitting efficiency detected by the efficiency detecting portion to the predetermined reference value, wherein
the controlling portion (i) temporarily stops power from being transmitted from the power transmitting portion if the transmitting efficiency detected by the efficiency detecting portion is less than the predetermined reference value, and (ii) continues to transmit power from the power transmitting portion if the transmitting efficiency detected by the efficiency detecting portion is equal to or greater than the predetermined reference value,
after a specified period of time has passed after temporarily stopping power from being transmitted from the power transmitting portion due to the transmitting efficiency detected by the efficiency detecting portion being less than the predetermined reference value, the controlling portion starts to transmit power again with a minute power, which is less than a regular power that was transmitted before the controlling portion temporarily stopped power from being transmitted,
the determining portion determines whether the transmitting efficiency detected by the efficiency detecting portion after starting to transmit power again with the minute power is equal to or greater than the predetermined reference value by comparing the transmitting efficiency detected by the efficiency detecting portion while the minute power is being transmitted to the predetermined reference value, and
if the transmitting efficiency detected by the efficiency detecting portion while the minute power is being transmitted is equal to or greater than the predetermined reference value, the controlling portion starts to transmit power again with the regular power from the power transmitting portion, and if the transmitting efficiency detected by the efficiency detecting portion while the minute power is being transmitted is less than the predetermined reference value, the controlling portion temporarily stops power from being transmitted from the power transmitting portion and then starts to transmit power again with the minute power after the specified period of time has passed.

2. The power supply system according to claim 1, further comprising:
a resonant frequency detecting portion that detects a resonant frequency of the power transmitting portion and a resonant frequency of the power receiving portion; and
a frequency adjusting portion that adjusts the resonant frequency of the power transmitting portion and the resonant frequency of the power receiving portion when the detected resonant frequency is off from a specified frequency.

3. The power supply system according to claim 2, wherein the frequency adjusting portion finishes adjusting the resonant frequency of the power receiving portion before power starts to be supplied from the power transmitting portion.

4. The power supply system according to claim 1, wherein the minute power is one hundredth of the regular power.

5. The power supply system according to claim 1, further comprising:
a storing portion that stores power received by the power receiving portion.

6. The power supply system according to claim 1, further comprising:
  a frequency characteristic detecting portion that detects a frequency characteristic of the transmitting efficiency; and
  a position ascertaining portion that ascertains the position of an obstruction between or near the power transmitting portion and the power receiving portion according to the frequency characteristic.

7. The power supply system according to claim 1, further comprising:
  a frequency characteristic detecting portion that determines a frequency characteristic of the transmitting efficiency; and
  a position ascertaining portion that ascertains the position of a coil of the power transmitting portion and the position of a coil of the power receiving portion according to the frequency characteristic.

8. The power supply system according to claim 7, wherein the position ascertaining portion ascertains the position of the coil of the power transmitting portion and the position of the coil of the power receiving portion according to the frequency characteristic.

9. The power supply system according to claim 7, further comprising:
  a position adjusting portion that adjusts the position of at least one of the coils if the position of the at least one of the coils ascertained by the position ascertaining portion is off.

10. A control method of a power supply system provided with a power transmitting portion, a power receiving portion that contactlessly receives power from the power transmitting portion, and a controlling portion that controls the transmission of power from the power transmitting portion, the control method comprising:
  detecting transmitting efficiency between the power transmitting portion and the power receiving portion while power is being transmitted from the power transmitting portion to the power receiving portion;
  determining whether the detected transmitting efficiency is equal to or greater than a predetermined reference value by comparing the detected transmitting efficiency to the predetermined reference value;
  temporarily stopping power from being transmitted from the power transmitting portion if the detected transmitting efficiency is less than the predetermined reference value, and continuing to transmit power from the power transmitting portion if the detected transmitting efficiency is equal to or greater than the predetermined reference value;
  after a specified period of time has passed after temporarily stopping power from being transmitted due to the detected transmitting efficiency being less than the predetermined reference value, starting to transmit power again with a minute power, which is less than a regular power that was transmitted before temporarily stopping power from being transmitted;
  determining whether the detected transmitting efficiency after starting to transmit power again with the minute power is equal to or greater than the predetermined reference value by comparing the detected transmitting efficiency while the minute power is being transmitted to the predetermined reference value; and
  if the detected transmitting efficiency while the minute power is being transmitted is equal to or greater than the predetermined reference value, starting to transmit power again with the regular power from the power transmitting portion, and if the detected transmitting efficiency while the minute power is being transmitted is less than the predetermined reference value, temporarily stopping power from being transmitted from the power transmitting portion and then starting to transmit power again with the minute power after the specified period of time has passed.

* * * * *